US012225999B2

(12) United States Patent
Yang et al.

(10) Patent No.: US 12,225,999 B2
(45) Date of Patent: Feb. 18, 2025

(54) VANITY MIRROR

(71) Applicant: simplehuman, LLC, Torrance, CA (US)

(72) Inventors: Frank Yang, Rancho Palos Verdes, CA (US); Ryan Thomas Wong, Los Angeles, CA (US); Samuel F. Pellicori, Santa Barbara, CA (US); Frederick Nicholas Bushroe, Tucson, AZ (US)

(73) Assignee: simplehuman, LLC, Torrance, CA (US)

( * ) Notice: Subject to any disclaimer, the term of this patent is extended or adjusted under 35 U.S.C. 154(b) by 682 days.

(21) Appl. No.: 16/573,279

(22) Filed: Sep. 17, 2019

(65) Prior Publication Data

US 2020/0085170 A1    Mar. 19, 2020

Related U.S. Application Data

(60) Provisional application No. 62/733,555, filed on Sep. 19, 2018.

(51) Int. Cl.
*A45D 42/10*    (2006.01)
*B32B 17/06*    (2006.01)
(Continued)

(52) U.S. Cl.
CPC ............ *A45D 42/10* (2013.01); *B32B 17/061* (2013.01); *B32B 17/10201* (2013.01);
(Continued)

(58) Field of Classification Search
CPC .. A45D 42/10; B60R 1/12; B60R 2001/1215; B60R 2001/1238; B32B 17/10201; A47G 1/04
(Continued)

(56) References Cited

U.S. PATENT DOCUMENTS

D44,537 S    8/1913    Mclsaac
D51,556 S    12/1917   Hawthorne
(Continued)

FOREIGN PATENT DOCUMENTS

CN    3044427    5/1996
CN    1190201 A  8/1998
(Continued)

OTHER PUBLICATIONS

Kore, "Building an intelligent voice controlled mirror," retrieved from the internet on Jul. 11, 2019: https://medium.com/@akshaykore/building-an-intelligent-voice-controlled-mirror-2edbc7d62c9e, Jun. 26, 2017, in 10 pages.
(Continued)

*Primary Examiner* — Ricky D Shafer
(74) *Attorney, Agent, or Firm* — Knobbe, Martens, Olson & Bear, LLP

(57) ABSTRACT

A mirror assembly can include a mirror, a display device, a window configured to provide a view of the display device, and a display region disposed on the front surface of the mirror. The mirror can include a glass layer, a dielectric layer, and a metal layer. In some embodiments, the glass layer is disposed closest to a user. The dielectric layer can include one or more alternating layers of Titanium dioxide and Silicon dioxide. In some embodiments, the display region is positioned outside of a central region of the mirror. The mirror assembly can include a first mirror coupled to a second mirror. In some embodiments, the transmissivity of the second mirror is higher than the transmissivity of the first mirror. In some embodiments, the reflectance of the second mirror is higher than the reflectance of the first mirror.

11 Claims, 9 Drawing Sheets

(51) Int. Cl.
  *B32B 17/10* (2006.01)
  *B60R 1/12* (2006.01)
  *G06F 3/041* (2006.01)
  *G06F 3/044* (2006.01)
(52) U.S. Cl.
  CPC .............. *B60R 1/12* (2013.01); *G06F 3/0412* (2013.01); *G06F 3/0443* (2019.05)
(58) Field of Classification Search
  USPC ........................................ 359/584, 839, 883
  See application file for complete search history.

(56) References Cited

U.S. PATENT DOCUMENTS

| | | | |
|---|---|---|---|
| 1,338,582 A * | 4/1920 | Morris | A47C 7/62 |
| | | | 297/185 |
| 1,451,236 A * | 4/1923 | Stanfield | A45D 42/18 |
| | | | 359/881 |
| D65,759 S | 10/1924 | Short | |
| 1,541,451 A | 6/1925 | Wallace | |
| 2,004,166 A | 6/1935 | Low | |
| 2,201,251 A * | 5/1940 | Van Patten | A45D 42/10 |
| | | | D26/56 |
| 2,235,281 A | 3/1941 | Carver | |
| 2,292,059 A | 8/1942 | Charles | |
| D163,481 S | 5/1951 | Rauh | |
| 2,687,674 A | 8/1954 | Emilea | |
| 2,737,852 A | 3/1956 | Porter et al. | |
| 3,006,252 A * | 10/1961 | Kacowski | A45C 15/04 |
| | | | 359/864 |
| 3,045,551 A | 7/1962 | Bonanno | |
| 3,315,932 A | 4/1967 | Chandler | |
| D208,234 S | 8/1967 | Ely | |
| D209,077 S | 10/1967 | Andre | |
| D213,392 S | 2/1969 | Andre | |
| D216,414 S | 12/1969 | Hanson | |
| 3,575,496 A | 4/1971 | Pollock et al. | |
| 3,623,356 A | 11/1971 | Bisberg | |
| 3,711,179 A | 1/1973 | Takeda | |
| 3,732,702 A | 5/1973 | Desch | |
| 3,751,140 A * | 8/1973 | Berlin | G02B 5/10 |
| | | | 248/481 |
| 3,751,141 A | 8/1973 | Brown | |
| 3,794,828 A | 2/1974 | Arpino | |
| 3,825,324 A | 7/1974 | Brewington | |
| 3,914,029 A | 11/1975 | Hoplock | |
| 3,949,767 A | 4/1976 | Rose | |
| D243,301 S | 2/1977 | Ravn | |
| D243,478 S | 2/1977 | Jones | |
| 4,129,355 A | 12/1978 | Noguchi | |
| D254,208 S | 2/1980 | Breslow | |
| 4,278,870 A | 7/1981 | Carleton et al. | |
| D261,845 S | 11/1981 | Wachtel | |
| D266,028 S | 8/1982 | Boyd | |
| 4,491,899 A | 1/1985 | Fleming | |
| D284,483 S | 7/1986 | Yang | |
| D290,662 S | 7/1987 | Basil et al. | |
| D307,358 S | 4/1990 | Gerton | |
| D309,833 S | 8/1990 | Wahl | |
| D317,531 S | 6/1991 | Evans | |
| 5,025,354 A | 6/1991 | Kondo | |
| 5,093,748 A | 3/1992 | Higdon | |
| 5,164,861 A | 11/1992 | Katz | |
| D335,580 S | 5/1993 | Gaullier | |
| 5,217,296 A | 6/1993 | Tanner et al. | |
| 5,267,081 A * | 11/1993 | Pein | B60R 1/083 |
| | | | 359/884 |
| 5,267,786 A | 12/1993 | Aisley | |
| 5,392,162 A | 2/1995 | Glucksman | |
| D378,159 S | 2/1997 | Mulkey | |
| D379,125 S | 5/1997 | Simjian | |
| D391,773 S | 3/1998 | Zaidman et al. | |
| 5,796,176 A | 8/1998 | Kramer et al. | |
| D409,003 S | 5/1999 | Scavini | |
| 5,979,976 A | 11/1999 | Ferencik | |
| 5,984,485 A | 11/1999 | Poli et al. | |
| 6,042,242 A | 3/2000 | Chang | |
| D425,313 S | 5/2000 | Zadro | |
| D426,182 S | 6/2000 | Brown | |
| 6,106,121 A | 8/2000 | Buckley et al. | |
| D431,375 S | 10/2000 | Zadro | |
| 6,158,877 A | 12/2000 | Zadro | |
| 6,206,530 B1 | 3/2001 | Eberts | |
| D442,371 S | 5/2001 | Eberts | |
| 6,231,992 B1 * | 5/2001 | Niebauer | G02B 5/0858 |
| | | | 359/360 |
| 6,241,357 B1 | 6/2001 | Lee | |
| 6,270,240 B1 | 8/2001 | Inoue | |
| 6,273,585 B1 | 8/2001 | Wu | |
| 6,305,809 B1 | 10/2001 | Zadro | |
| D454,701 S | 3/2002 | Eric | |
| D459,094 S | 6/2002 | Stone et al. | |
| 6,420,682 B1 | 7/2002 | Sellgren et al. | |
| 6,466,826 B1 | 10/2002 | Nishihira et al. | |
| D465,490 S | 11/2002 | Wei | |
| 6,496,107 B1 | 12/2002 | Himmelstein | |
| 6,553,123 B1 | 4/2003 | Dykstra | |
| D474,432 S | 5/2003 | Good | |
| 6,560,027 B2 | 5/2003 | Meine | |
| 6,594,630 B1 | 7/2003 | Zlokarnik et al. | |
| 6,604,836 B2 | 8/2003 | Carlucci et al. | |
| 6,676,272 B2 | 1/2004 | Chance | |
| D486,964 S | 2/2004 | Prince et al. | |
| D488,626 S | 4/2004 | Kruger | |
| D492,230 S | 6/2004 | Berger | |
| 6,830,154 B2 | 12/2004 | Zadro | |
| 6,848,822 B2 | 2/2005 | Ballen et al. | |
| 6,854,852 B1 * | 2/2005 | Zadro | A45D 42/14 |
| | | | 359/872 |
| D505,555 S | 5/2005 | Snell | |
| 6,886,351 B2 | 5/2005 | Palfy et al. | |
| D508,883 S | 8/2005 | Falconer | |
| D509,369 S | 9/2005 | Snell | |
| D511,413 S | 11/2005 | Yue | |
| 6,961,168 B2 | 11/2005 | Agrawal et al. | |
| D512,841 S | 12/2005 | Dirks | |
| 7,004,599 B2 | 2/2006 | Mullani | |
| 7,048,406 B1 | 5/2006 | Shih | |
| 7,054,668 B2 | 5/2006 | Endo et al. | |
| D524,469 S | 7/2006 | Pitot et al. | |
| 7,090,378 B1 | 8/2006 | Zadro | |
| D532,981 S | 12/2006 | Zadro | |
| D540,549 S | 4/2007 | Yue | |
| 7,233,154 B2 | 6/2007 | Groover et al. | |
| D546,567 S | 7/2007 | Bhavnani | |
| D547,555 S | 7/2007 | Lo et al. | |
| D558,987 S | 1/2008 | Gildersleeve | |
| D562,571 S | 2/2008 | Pitot | |
| 7,341,356 B1 | 3/2008 | Zadro | |
| 7,347,573 B1 | 3/2008 | Isler | |
| 7,349,144 B2 | 3/2008 | Varaprasad et al. | |
| D568,081 S | 5/2008 | Thompson et al. | |
| D569,671 S | 5/2008 | Thompson et al. | |
| 7,370,982 B2 | 5/2008 | Bauer et al. | |
| D572,024 S | 7/2008 | Shapiro | |
| 7,393,115 B2 | 7/2008 | Tokushita et al. | |
| D574,159 S | 8/2008 | Howard | |
| 7,417,699 B2 | 8/2008 | Yun et al. | |
| 7,423,522 B2 | 9/2008 | O'Brien et al. | |
| 7,435,928 B2 | 10/2008 | Platz | |
| 7,446,924 B2 | 11/2008 | Schofield et al. | |
| 7,455,412 B2 | 11/2008 | Rottcher | |
| D582,984 S | 12/2008 | Mininger et al. | |
| D584,516 S | 1/2009 | Otomo | |
| 7,500,755 B2 | 3/2009 | Ishizaki et al. | |
| 7,513,476 B1 | 4/2009 | Huang | |
| 7,551,354 B2 | 6/2009 | Horsten et al. | |
| 7,570,413 B2 | 8/2009 | Tonar et al. | |
| 7,589,893 B2 | 9/2009 | Rottcher | |
| 7,621,651 B2 | 11/2009 | Chan et al. | |
| 7,626,655 B2 | 12/2009 | Yamazaki et al. | |
| 7,636,195 B2 | 12/2009 | Nieuwkerk et al. | |

(56) References Cited

U.S. PATENT DOCUMENTS

| | | | |
|---|---|---|---|
| 7,651,229 B1 * | 1/2010 | Rimback | A45D 42/16 |
| | | | 359/872 |
| 7,679,809 B2 | 3/2010 | Tonar et al. | |
| 7,728,927 B2 | 6/2010 | Nieuwkerk et al. | |
| 7,805,260 B2 | 9/2010 | Mischel, Jr. et al. | |
| D625,930 S | 10/2010 | Merica | |
| 7,813,023 B2 | 10/2010 | Baur | |
| 7,813,060 B1 | 10/2010 | Bright et al. | |
| 7,826,123 B2 | 11/2010 | McCabe et al. | |
| 7,853,414 B2 | 12/2010 | Mischel, Jr. et al. | |
| 7,855,755 B2 | 12/2010 | Weller et al. | |
| 7,856,248 B1 | 12/2010 | Fujisaki | |
| 7,859,737 B2 | 12/2010 | McCabe et al. | |
| 7,859,738 B2 | 12/2010 | Baur et al. | |
| 7,864,399 B2 | 1/2011 | McCabe et al. | |
| D635,009 S | 3/2011 | Paterson | |
| 7,898,719 B2 | 3/2011 | Schofield et al. | |
| 7,903,335 B2 | 3/2011 | Nieuwkerk et al. | |
| 7,916,129 B2 | 3/2011 | Lin et al. | |
| 7,916,380 B2 | 3/2011 | Tonar et al. | |
| 7,953,648 B2 | 5/2011 | Vock | |
| D639,077 S | 6/2011 | DeBretton Gordon | |
| 7,978,393 B2 | 7/2011 | Tonar et al. | |
| 8,004,741 B2 | 8/2011 | Tonar et al. | |
| D647,444 S | 10/2011 | Manukyan et al. | |
| D649,790 S | 12/2011 | Pitot | |
| 8,083,386 B2 | 12/2011 | Lynam | |
| D652,220 S | 1/2012 | Pitot | |
| 8,099,247 B2 | 1/2012 | Mischel, Jr. et al. | |
| D656,979 S | 4/2012 | Yip et al. | |
| D657,425 S | 4/2012 | Podd | |
| D657,576 S | 4/2012 | Pitot | |
| 8,154,418 B2 | 4/2012 | Peterson et al. | |
| 8,162,502 B1 | 4/2012 | Zadro | |
| D658,604 S | 5/2012 | Egawa et al. | |
| D660,367 S | 5/2012 | Podd | |
| D660,368 S | 5/2012 | Podd | |
| D660,369 S | 5/2012 | Podd | |
| 8,179,236 B2 | 5/2012 | Weller et al. | |
| 8,179,586 B2 | 5/2012 | Schofield et al. | |
| 8,194,133 B2 | 6/2012 | DeWind et al. | |
| 8,228,588 B2 | 7/2012 | McCabe et al. | |
| D665,030 S | 8/2012 | Podd | |
| D666,010 S | 8/2012 | Farley | |
| D670,087 S | 11/2012 | Walker | |
| 8,335,032 B2 | 12/2012 | McCabe et al. | |
| 8,348,441 B1 | 1/2013 | Skelton | |
| 8,356,908 B1 | 1/2013 | Zadro | |
| 8,379,289 B2 | 2/2013 | Schofield et al. | |
| 8,382,189 B2 | 2/2013 | Li et al. | |
| 8,393,749 B1 | 3/2013 | Daicos | |
| 8,400,704 B2 | 3/2013 | McCabe et al. | |
| D679,101 S | 4/2013 | Pitot | |
| D679,102 S | 4/2013 | Gilboe et al. | |
| D680,755 S | 4/2013 | Gilboe et al. | |
| 8,503,062 B2 | 8/2013 | Baur et al. | |
| 8,506,096 B2 | 8/2013 | McCabe et al. | |
| 8,508,832 B2 | 8/2013 | Baumann et al. | |
| 8,511,841 B2 | 8/2013 | Varaprasad et al. | |
| D688,883 S | 9/2013 | Gilboe et al. | |
| D689,701 S | 9/2013 | Mischel, Jr. et al. | |
| 8,559,092 B2 | 10/2013 | Bugno et al. | |
| 8,559,093 B2 | 10/2013 | Varaprasad et al. | |
| 8,585,273 B2 | 11/2013 | Pokrovskiy et al. | |
| D699,448 S | 2/2014 | Yang et al. | |
| D699,952 S | 2/2014 | Yang et al. | |
| 8,649,082 B2 | 2/2014 | Baur | |
| D701,050 S | 3/2014 | Yang et al. | |
| D701,507 S | 3/2014 | Cope | |
| 8,705,161 B2 | 4/2014 | Schofield et al. | |
| 8,727,547 B2 | 5/2014 | McCabe et al. | |
| D707,454 S | 6/2014 | Pitot | |
| 8,743,051 B1 | 6/2014 | Moy et al. | |
| D711,871 S | 8/2014 | Daniel | |
| D711,874 S | 8/2014 | Cope | |
| 8,797,627 B2 | 8/2014 | McCabe et al. | |
| D712,963 S | 9/2014 | Fleet | |
| 8,880,360 B2 | 11/2014 | Mischel, Jr. et al. | |
| 8,910,402 B2 * | 12/2014 | Mischel, Jr. | G09F 19/14 |
| | | | 362/135 |
| D727,630 S | 4/2015 | Zadro | |
| D729,525 S | 5/2015 | Tsai | |
| D729,527 S | 5/2015 | Tsai | |
| D730,065 S | 5/2015 | Tsai | |
| 9,068,737 B2 | 6/2015 | Kirchberger et al. | |
| 9,090,211 B2 | 7/2015 | McCabe et al. | |
| D736,001 S | 8/2015 | Yang et al. | |
| D737,059 S | 8/2015 | Tsai | |
| D737,060 S | 8/2015 | Yang et al. | |
| 9,105,202 B2 | 8/2015 | Mischel, Jr. et al. | |
| D737,580 S | 9/2015 | Tsai | |
| D738,118 S | 9/2015 | Gyanendra et al. | |
| 9,170,353 B2 | 10/2015 | Chang | |
| 9,173,509 B2 | 11/2015 | Mischel, Jr. et al. | |
| 9,174,578 B2 | 11/2015 | Uken et al. | |
| 9,205,780 B2 | 12/2015 | Habibi et al. | |
| 9,232,846 B2 | 1/2016 | Fung | |
| 9,254,789 B2 | 2/2016 | Anderson et al. | |
| D751,829 S | 3/2016 | Yang et al. | |
| D754,446 S | 4/2016 | Yang et al. | |
| 9,327,649 B2 | 5/2016 | Habibi | |
| 9,341,914 B2 | 5/2016 | McCabe et al. | |
| 9,347,660 B1 | 5/2016 | Zadro | |
| D764,592 S | 8/2016 | Zenoff | |
| 9,499,103 B2 | 11/2016 | Han | |
| 9,510,711 B2 | 12/2016 | Tsibulevskiy et al. | |
| 9,528,695 B2 | 12/2016 | Adachi et al. | |
| D776,945 S | 1/2017 | Yang | |
| D779,836 S | 2/2017 | Bailey | |
| D785,345 S | 5/2017 | Yang et al. | |
| 9,638,410 B2 | 5/2017 | Yang et al. | |
| 9,694,751 B2 | 7/2017 | Lundy, Jr. et al. | |
| 9,709,869 B2 | 7/2017 | Baumann et al. | |
| D793,099 S | 8/2017 | Bailey | |
| 9,765,958 B2 | 9/2017 | Lumaye et al. | |
| D801,060 S | 10/2017 | Hollinger | |
| 9,827,912 B2 | 11/2017 | Olesen et al. | |
| 9,845,537 B2 | 12/2017 | Mischel, Jr. et al. | |
| 9,878,670 B2 | 1/2018 | McCabe et al. | |
| 9,897,306 B2 | 2/2018 | Yang et al. | |
| 9,921,390 B1 | 3/2018 | Mischel, Jr. et al. | |
| 9,933,595 B1 | 4/2018 | Mischel, Jr. et al. | |
| D816,350 S | 5/2018 | Yang et al. | |
| 10,016,045 B1 | 7/2018 | Hollinger | |
| 10,023,123 B2 | 7/2018 | Takada et al. | |
| 10,029,616 B2 | 7/2018 | McCabe et al. | |
| 10,035,461 B2 | 7/2018 | Lin et al. | |
| D825,940 S | 8/2018 | Liu | |
| 10,076,176 B2 | 9/2018 | Yang et al. | |
| D830,706 S | 10/2018 | Pitot | |
| 10,161,622 B1 * | 12/2018 | Frazier | A45D 42/14 |
| D840,699 S | 2/2019 | Xie | |
| D845,652 S | 4/2019 | Yang et al. | |
| D846,288 S | 4/2019 | Yang et al. | |
| D848,158 S | 5/2019 | Yang et al. | |
| D850,125 S | 6/2019 | Wang et al. | |
| D854,838 S | 7/2019 | Jeon et al. | |
| D869,863 S | 12/2019 | Liu | |
| D871,084 S | 12/2019 | Pestl et al. | |
| 10,524,591 B2 | 1/2020 | Kim | |
| D874,161 S | 2/2020 | Yang et al. | |
| D874,162 S | 2/2020 | Greenwalt | |
| D878,776 S | 3/2020 | Liu | |
| D879,481 S | 3/2020 | Yang | |
| D879,482 S | 3/2020 | Yang | |
| D882,280 S | 4/2020 | Yang | |
| 10,652,447 B1 | 5/2020 | Pestl et al. | |
| D885,769 S | 6/2020 | Wang | |
| D891,121 S | 7/2020 | Zhao et al. | |
| D891,123 S | 7/2020 | Li et al. | |
| D891,125 S | 7/2020 | Liu | |
| 10,702,043 B2 | 7/2020 | Yang et al. | |
| D891,792 S | 8/2020 | Yang | |
| D892,508 S | 8/2020 | Yang | |

(56) References Cited

U.S. PATENT DOCUMENTS

| | | | |
|---|---|---|---|
| D893,892 S | 8/2020 | Rajasekaran et al. | |
| 10,746,394 B2 | 8/2020 | Yang et al. | |
| D894,615 S | 9/2020 | Yang | |
| D895,305 S | 9/2020 | Yang | |
| D897,694 S | 10/2020 | Lin | |
| D897,695 S | 10/2020 | Yang | |
| D898,383 S | 10/2020 | Zhou | |
| D898,386 S | 10/2020 | Huang | |
| D898,387 S | 10/2020 | Yang | |
| D901,908 S | 11/2020 | Zhao et al. | |
| 10,869,537 B2 | 12/2020 | Yang et al. | |
| D909,770 S | 2/2021 | Li et al. | |
| D918,602 S | 5/2021 | Chen | |
| D919,981 S | 5/2021 | Li | |
| D919,983 S | 5/2021 | Yang | |
| D919,984 S | 5/2021 | Yang | |
| 11,013,307 B2 | 5/2021 | Yang et al. | |
| 11,026,497 B2 | 6/2021 | Yang et al. | |
| D924,456 S | 7/2021 | Zhao et al. | |
| D925,928 S | 7/2021 | Yang et al. | |
| D927,863 S | 8/2021 | Yang et al. | |
| D932,198 S | 10/2021 | Sze | |
| D932,781 S | 10/2021 | Liu | |
| D933,374 S | 10/2021 | Luo | |
| D935,791 S | 11/2021 | Li et al. | |
| D938,170 S | 12/2021 | Liu | |
| D939,842 S | 1/2022 | Li et al. | |
| D939,843 S | 1/2022 | Li et al. | |
| D942,159 S | 2/2022 | Yang | |
| D949,579 S | 4/2022 | Chen | |
| 11,371,692 B2 | 6/2022 | Yang et al. | |
| 11,566,784 B2 | 1/2023 | Yang et al. | |
| 11,622,614 B2 | 4/2023 | Yang et al. | |
| 11,640,042 B2 | 5/2023 | Yang et al. | |
| D990,174 S | 6/2023 | Yang et al. | |
| 11,708,031 B2 | 7/2023 | Yang et al. | |
| D1,009,485 S | 1/2024 | Yang et al. | |
| 2002/0196333 A1 | 12/2002 | Gorischek | |
| 2003/0030063 A1 | 2/2003 | Sosniak et al. | |
| 2003/0031010 A1 | 2/2003 | Sosniak et al. | |
| 2003/0065515 A1 | 4/2003 | Yokota | |
| 2003/0133292 A1 | 7/2003 | Mueller et al. | |
| 2003/0223250 A1 | 12/2003 | Ballen et al. | |
| 2004/0020509 A1 | 2/2004 | Waisman | |
| 2004/0027695 A1* | 2/2004 | Lin | B60R 1/083 359/839 |
| 2004/0125592 A1 | 7/2004 | Nagakubo et al. | |
| 2004/0156133 A1 | 8/2004 | Vernon | |
| 2004/0173498 A1 | 9/2004 | Lee | |
| 2005/0036300 A1 | 2/2005 | Dowling et al. | |
| 2005/0068646 A1 | 3/2005 | Lev et al. | |
| 2005/0128612 A1 | 6/2005 | Ro | |
| 2005/0146863 A1 | 7/2005 | Mullani | |
| 2005/0156753 A1 | 7/2005 | Deline et al. | |
| 2005/0243556 A1 | 11/2005 | Lynch | |
| 2005/0270769 A1 | 12/2005 | Smith | |
| 2005/0276053 A1 | 12/2005 | Nortrup et al. | |
| 2006/0006988 A1* | 1/2006 | Harter | B60Q 9/008 348/148 |
| 2006/0077654 A1 | 4/2006 | Krieger et al. | |
| 2006/0132923 A1 | 6/2006 | Hsiao et al. | |
| 2006/0164725 A1* | 7/2006 | Horsten | G02B 5/08 359/838 |
| 2006/0184993 A1 | 8/2006 | Goldthwaite et al. | |
| 2006/0186314 A1 | 8/2006 | Leung | |
| 2006/0286396 A1* | 12/2006 | Jonza | B32B 27/308 428/480 |
| 2007/0040033 A1 | 2/2007 | Rosenberg | |
| 2007/0050211 A1* | 3/2007 | Mandl | A47G 1/04 359/850 |
| 2007/0097672 A1 | 5/2007 | Benn | |
| 2007/0146616 A1* | 6/2007 | Nouchi | G02F 1/1333 349/155 |
| 2007/0159846 A1 | 7/2007 | Nishiyama et al. | |
| 2007/0183037 A1 | 8/2007 | De Boer et al. | |
| 2007/0263999 A1 | 11/2007 | Keam | |
| 2007/0297189 A1 | 12/2007 | Wu et al. | |
| 2008/0024864 A1* | 1/2008 | Alberti | B60R 1/1207 359/515 |
| 2008/0078796 A1 | 4/2008 | Parsons | |
| 2008/0088244 A1 | 4/2008 | Morishita | |
| 2008/0118080 A1 | 5/2008 | Gratke et al. | |
| 2008/0130305 A1 | 6/2008 | Wang et al. | |
| 2008/0244940 A1 | 10/2008 | Mesika | |
| 2008/0258110 A1 | 10/2008 | Oshio | |
| 2008/0265799 A1 | 10/2008 | Sibert | |
| 2008/0271354 A1 | 11/2008 | Bostrom | |
| 2008/0294012 A1 | 11/2008 | Kurtz et al. | |
| 2008/0297586 A1 | 12/2008 | Kurtz et al. | |
| 2008/0298080 A1 | 12/2008 | Wu et al. | |
| 2009/0027902 A1 | 1/2009 | Fielding et al. | |
| 2009/0097252 A1 | 4/2009 | Liou et al. | |
| 2009/0194670 A1 | 8/2009 | Rains, Jr. et al. | |
| 2009/0207339 A1 | 8/2009 | Ajichi et al. | |
| 2009/0213604 A1 | 8/2009 | Uken | |
| 2009/0244740 A1 | 10/2009 | Takayanagi et al. | |
| 2009/0301927 A1 | 12/2009 | Fvlbrook et al. | |
| 2010/0033988 A1 | 2/2010 | Chiu et al. | |
| 2010/0118422 A1 | 5/2010 | Holacka | |
| 2010/0118520 A1 | 5/2010 | Stern et al. | |
| 2010/0214662 A1* | 8/2010 | Takayanagi | B60R 1/088 156/87 |
| 2010/0296298 A1 | 11/2010 | Martin, Jr. | |
| 2010/0309159 A1 | 12/2010 | Roettcher | |
| 2011/0058269 A1 | 3/2011 | Su | |
| 2011/0074225 A1 | 3/2011 | Delnoij et al. | |
| 2011/0080374 A1 | 4/2011 | Feng et al. | |
| 2011/0168687 A1 | 7/2011 | Door et al. | |
| 2011/0194200 A1 | 8/2011 | Greenlee | |
| 2011/0211079 A1 | 9/2011 | Rolston | |
| 2011/0273659 A1 | 11/2011 | Sobecki | |
| 2011/0283577 A1 | 11/2011 | Cornelissen et al. | |
| 2012/0056738 A1 | 3/2012 | Lynam | |
| 2012/0080903 A1 | 4/2012 | Li et al. | |
| 2012/0081915 A1 | 4/2012 | Foote et al. | |
| 2012/0229789 A1 | 9/2012 | Kang et al. | |
| 2012/0307490 A1 | 12/2012 | Ellis | |
| 2013/0026512 A1 | 1/2013 | Tsai | |
| 2013/0077292 A1 | 3/2013 | Zimmerman | |
| 2013/0120989 A1 | 5/2013 | Sun et al. | |
| 2013/0190845 A1 | 7/2013 | Liu et al. | |
| 2013/0235607 A1 | 9/2013 | Yang et al. | |
| 2013/0235610 A1 | 9/2013 | Yang et al. | |
| 2014/0240964 A1 | 8/2014 | Adachi et al. | |
| 2014/0265768 A1 | 9/2014 | Diemel, Jr. et al. | |
| 2015/0060431 A1 | 3/2015 | Yang et al. | |
| 2015/0203970 A1 | 7/2015 | Mischel, Jr. et al. | |
| 2015/0205110 A1 | 7/2015 | Mischel, Jr. et al. | |
| 2015/0305113 A1 | 10/2015 | Ellis | |
| 2016/0045015 A1 | 2/2016 | Baldwin | |
| 2016/0070085 A1 | 3/2016 | Mischel, Jr. et al. | |
| 2016/0082890 A1 | 3/2016 | Habibi et al. | |
| 2016/0178964 A1 | 6/2016 | Sakai et al. | |
| 2016/0193902 A1 | 7/2016 | Hill et al. | |
| 2016/0200256 A1 | 7/2016 | Takada et al. | |
| 2016/0243989 A1 | 8/2016 | Habibi | |
| 2016/0255941 A1* | 9/2016 | Yang | A47G 1/04 |
| 2017/0028924 A1 | 2/2017 | Baur et al. | |
| 2017/0139302 A1 | 5/2017 | Tonar | |
| 2017/0158139 A1 | 6/2017 | Tonar et al. | |
| 2017/0164719 A1 | 6/2017 | Wheeler | |
| 2017/0181541 A1 | 6/2017 | Stanley, Jr. et al. | |
| 2017/0188020 A1* | 6/2017 | Sakai | G02F 1/133553 |
| 2017/0190290 A1 | 7/2017 | Lin et al. | |
| 2017/0257543 A1 | 9/2017 | Rowles et al. | |
| 2017/0285392 A1 | 10/2017 | Hirata et al. | |
| 2017/0297495 A1 | 10/2017 | Lundy, Jr. et al. | |
| 2017/0297498 A1 | 10/2017 | Larson et al. | |
| 2017/0313251 A1 | 11/2017 | Uken et al. | |
| 2017/0322389 A1 | 11/2017 | Hagestad et al. | |
| 2017/0349102 A1 | 12/2017 | Habibi | |
| 2018/0012526 A1 | 1/2018 | Dunn et al. | |
| 2018/0015880 A1 | 1/2018 | Olesen et al. | |

(56) References Cited

U.S. PATENT DOCUMENTS

| | | | |
|---|---|---|---|
| 2018/0017823 | A1 | 1/2018 | Saenger Nayver et al. |
| 2018/0032227 | A1 | 2/2018 | Broxson |
| 2018/0050641 | A1 | 2/2018 | Lin et al. |
| 2018/0105114 | A1 | 4/2018 | Geerlings et al. |
| 2018/0147993 | A1 | 5/2018 | McCabe et al. |
| 2018/0162269 | A1 | 6/2018 | Bredeweg et al. |
| 2018/0172265 | A1 | 6/2018 | Yang et al. |
| 2018/0245786 | A1 | 8/2018 | Fujiwara |
| 2018/0251069 | A1 | 9/2018 | LaCross et al. |
| 2018/0263362 | A1 | 9/2018 | Yang et al. |
| 2018/0268747 | A1* | 9/2018 | Braun .................. G06V 40/172 |
| 2018/0270410 | A1 | 9/2018 | Lyle et al. |
| 2018/0343418 | A1* | 11/2018 | Van Ness ............... H04N 7/147 |
| 2019/0000219 | A1 | 1/2019 | Yang et al. |
| 2019/0003699 | A1 | 1/2019 | Mondora |
| 2019/0054863 | A1 | 2/2019 | Roth |
| 2019/0086890 | A1 | 3/2019 | Bradley et al. |
| 2019/0087788 | A1 | 3/2019 | Murphy et al. |
| 2019/0089550 | A1 | 3/2019 | Rexach et al. |
| 2019/0172464 | A1 | 6/2019 | Bargetzi et al. |
| 2019/0246772 | A1 | 8/2019 | Yang et al. |
| 2019/0250781 | A1 | 8/2019 | Savitski |
| 2019/0267825 | A1 | 8/2019 | Chien |
| 2019/0138704 | A1 | 9/2019 | Shrivastava et al. |
| 2019/0291647 | A1 | 9/2019 | Yang et al. |
| 2019/0328161 | A1 | 10/2019 | Wei |
| 2019/0351830 | A1 | 11/2019 | Bosma et al. |
| 2020/0008592 | A1 | 1/2020 | Meyers et al. |
| 2020/0268127 | A1 | 8/2020 | Yang et al. |
| 2020/0278514 | A1 | 9/2020 | Yang et al. |
| 2020/0333934 | A1 | 10/2020 | Pestl et al. |
| 2021/0025584 | A1 | 1/2021 | Yang et al. |
| 2021/0137266 | A1 | 5/2021 | Pestl et al. |
| 2021/0196028 | A1 | 7/2021 | Yang et al. |
| 2021/0307491 | A1 | 10/2021 | Yang et al. |
| 2021/0364892 | A1 | 11/2021 | Copeland et al. |
| 2022/0282861 | A1 | 9/2022 | Yang et al. |
| 2023/0102011 | A1 | 3/2023 | Yang et al. |
| 2023/0204201 | A1 | 6/2023 | Yang et al. |

FOREIGN PATENT DOCUMENTS

| | | | |
|---|---|---|---|
| CN | 2379638 | Y | 5/2000 |
| CN | 3357935 | | 3/2004 |
| CN | 2852806 | Y | 1/2007 |
| CN | 2925206 | Y | 7/2007 |
| CN | 300746709 | | 2/2008 |
| CN | 101160003 | A | 4/2008 |
| CN | 101382025 | A | 3/2009 |
| CN | 300973066 | S | 8/2009 |
| CN | 300983799 | S | 8/2009 |
| CN | 300990023 | S | 8/2009 |
| CN | 301001894 | S | 9/2009 |
| CN | 201335322 | Y | 10/2009 |
| CN | 201388790 | Y | 1/2010 |
| CN | 301108997 | S | 1/2010 |
| CN | 301209880 | S | 5/2010 |
| CN | 101787830 | A | 7/2010 |
| CN | 301278203 | S | 7/2010 |
| CN | 301340032 | S | 9/2010 |
| CN | 301502988 | S | 4/2011 |
| CN | 102057756 | A | 5/2011 |
| CN | 102109129 | A | 6/2011 |
| CN | 301583101 | S | 6/2011 |
| CN | 301811715 | S | 1/2012 |
| CN | 302103915 | S | 10/2012 |
| CN | 302140631 | S | 10/2012 |
| CN | 302140632 | S | 10/2012 |
| CN | 302337970 | S | 3/2013 |
| CN | 302363850 | S | 3/2013 |
| CN | 302396166 | S | 4/2013 |
| CN | 302442518 | S | 5/2013 |
| CN | 103300590 | A | 9/2013 |
| CN | 302638575 | S | 11/2013 |
| CN | 302668773 | S | 12/2013 |
| CN | 204146556 | U | 2/2015 |
| CN | 205265762 | U | 5/2016 |
| CN | 205072328 | U | 9/2016 |
| CN | 106377049 | A | 2/2017 |
| CN | 206119539 | | 4/2017 |
| CN | 106723885 | A | 5/2017 |
| CN | 206371658 | | 8/2017 |
| CN | 108185741 | A | 6/2018 |
| CN | 108308888 | | 7/2018 |
| CN | 207626762 | U | 7/2018 |
| CN | 108713949 | | 10/2018 |
| CN | 211577476 | U | 9/2020 |
| CN | 211600392 | U | 9/2020 |
| CN | 111759073 | A | 10/2020 |
| CN | 306124222 | | 10/2020 |
| CN | 308268382 | S | 10/2023 |
| CN | 308330983 | S | 11/2023 |
| CN | 308338019 | S | 11/2023 |
| DE | 2924529 | A1 | 1/1981 |
| DE | 29904039 | U1 | 6/1999 |
| DE | 20014279 | U1 | 2/2001 |
| DE | 102004042929 | A1 | 3/2006 |
| DE | 202007013393 | U1 | 12/2007 |
| DE | 102006060781 | A1 | 4/2008 |
| DE | 202009004795 | U1 | 9/2009 |
| DE | 202010000170 | U1 | 7/2010 |
| DE | 202012103555 | U1 | 2/2014 |
| EP | 0367134 | | 5/1990 |
| EP | 1792553 | A2 | 6/2007 |
| FR | 2 788 951 | | 8/2000 |
| GB | 2346206 | A | 8/2000 |
| GB | 2363712 | * | 1/2002 |
| JP | S49-131097 | | 11/1974 |
| JP | 55-129073 | | 10/1980 |
| JP | 59-166769 | | 11/1984 |
| JP | S62-112931 | | 7/1987 |
| JP | H05-009413 | | 2/1993 |
| JP | 3057292 | | 12/1998 |
| JP | 2003-79495 | | 3/2003 |
| JP | 2004-290531 | A | 10/2004 |
| JP | 2006-202602 | A | 8/2006 |
| JP | 2007-000204 | A | 1/2007 |
| JP | 2008-073174 | A | 4/2008 |
| JP | 2013-172802 | | 9/2013 |
| JP | 2014-212075 | W | 11/2014 |
| JP | 2016-168171 | A | 9/2016 |
| JP | 2016-179173 | A | 10/2016 |
| JP | 2017-144039 | | 8/2017 |
| JP | 2018-167022 | A | 11/2018 |
| JP | 7497367 | | 6/2024 |
| KR | 30-0318286 | | 2/2003 |
| KR | 2003-0017261 | A | 3/2003 |
| KR | 30-0330692 | | 8/2003 |
| KR | 200400903 | Y1 | 11/2005 |
| KR | 30-0507873 | | 10/2008 |
| KR | 30-0586341 | | 1/2011 |
| KR | 30-0692452 | | 5/2013 |
| KR | 30-0712086 | | 10/2013 |
| WO | WO 2004/074886 | A1 | 9/2004 |
| WO | WO 2013/047784 | A1 | 4/2013 |
| WO | WO 2018/045649 | A1 | 3/2018 |
| WO | WO 2020/061091 | A1 | 3/2020 |

OTHER PUBLICATIONS

International Search Report and Written Opinion in co-pending International Application No. PCT/US2019/051576, mailed Dec. 4, 2019 in 16 pages.
U.S. Appl. No. 29/723,452, filed Feb. 6, 2020, Yang et al.
Zadro Z'fogless Mirror with Light, available from internet at http://www.amazon.com/Zadro-1X-Zfogless-Adjustable-Magnification/dp/B000ARWLIW/ref=sr_1_16?s=beauty&ie=UTF8&qid=1439229012&sr=1-16&keywords=zadro+lighted+fogless+mirror, apparently available Nov. 27, 2006, site visited Aug. 10, 2015.
U.S. Appl. No. 15/073,990, filed Mar. 18, 2016, Yang et al.
U.S. Appl. No. 29/631,301, filed Dec. 28, 2017, Yang et al.
U.S. Appl. No. 29/662,730, filed Sep. 7, 2018, Yang et al.

(56) References Cited

OTHER PUBLICATIONS

U.S. Appl. No. 29/689,860, filed May 2, 2019, Yang et al.
Advanced Lighting Guidelines, 1993 (second edition), Chapter entitled, "Occupant Sensors", Published by California Energy Commission (CEC Pub.), in 14 pages.
Simple Human Vanity Mirror, available from internet at http://www.bedbathandbeyond.com/store/products/simplehuman-reg-5x-sensor-vanity-mirror/1041483503?categoryld=12028, apparently available Dec. 19, 2013, site visited Dec. 2, 2014.
Simple Human Sensor Mirror, Internet Archive Wayback Machine webpage capture of http://www.tuvie.com/stainless-steel-sensor-mirror-by-simplehuman/, apparently available Jan. 27, 2013, site visited Dec. 2, 2014.
Simplehuman Mini Sensor Mirror, available from internet at http://www.amazon.com/gp/product/B00FZ3MFAA/ref=pd_Ipo_sbs_dp_ss_2?pf_rd_p=1944579862&pf_rd_s=Ipo-top-stripe-1&pf_rd_t=201&pf_rd_i=B00M8MC5H4&pf_rd_m=ATVPDKIKXODER&pf_rd_r=0RHFJEABM9QKSWJKK99N#Ask, apparently available Mar. 11, 2014, site visited Jan. 8, 2015.
Simplehuman Sensor Mirror, available from internet at http://www.amazon.com/simplehuman-Sensor-Sensor-Activated-Lighted-Magnification/dp/B00M8MC5H4#customerReviews, apparently available Dec. 31, 2014, site visited Jan. 8, 2015.
Simplehuman Wall Mount Mirror, available from internet at http://www.amazon.com/simplehuman-Wall-Mount-Sensor-Mirror/dp/B00FN92ELG#customerReviews, available at least as early as Jan. 31, 2013, site visited Jan. 8, 2015.
Simplehuman Wide View Sensor Mirror, available from internet at http://www.amazon.com/simplehuman-Wide-View-Sensor-Mirror/dp/B01C2RXD7K, site visited Aug. 9, 2016.
Simplehuman Sensor Mirror Pro Wide-View, available from internet at http://www.simplehuman.com/wide-view-sensor-mirror, site visited Aug. 9, 2016.
Brookstone Shower Mirror, available from internet at http://www.brookstone.com/9-Lighted-Fogless-Shower-Mirror?bkiid=?SubCategory_Bath_Spa_Mirrors_Lighting_Makeup_Mirrors%7CSubCategoryWidget%7C608364p&catld=n/, apparently available Jan. 15, 2013, site visited Dec. 2, 2014.
Jerdon Wall Mounted Mirror, available from internet at http://www.amazon.com/Jerdon-HL1016NL-9-5-Inch-Lighted-Magnification/dp/B00413G9K2/ref=sr_1_26?ie=UTF8&qid=1420579897&sr=8-26&keywords=wall+mounted+mirror#customerReviews, apparently available Feb. 21, 2009, site visited Jan. 8, 2015.
Jerdon Wall Mounted Mirror, available from internet at http://www.amazon.com/Jerdon-JD7C-9-Inch-Lighted-Magnification/dp/B001DKVC08/ref=sr_1_54?ie=UTF8&qid=1420580127&sr=8-54&keywords=wall+mounted+mirror, apparently available Oct. 6, 2010, site visited Jan. 8, 2015.
International Preliminary Report on Patentability in corresponding International Application No. PCT/US2019/051576, dated Apr. 1, 2021, in 9 pages.
Partial Supplementary Search Report in corresponding European Application No. 19862073.4, dated May 18, 2022, in 10 pages.
Jerdon, Model JRT910CL 5X Magnified Lighted Tabletop Rectangular Mirror, Chrome Finish, 67.2 Ounce, https://www.amazon.com/Jerdon-JRT910CL-Magnified-Tabletop-Rectangular/dp/B00N1WE3UC?th=1, Jun. 2015, in 8 pages.
Sharper Image, Model JRT718CL Product Specification, Slimline Series LED Lighted Wall Mount Mirror, copyright 2015, https://www.ameraproducts.com/Shard/ProductLitirature/Jerdon/JRT718CL-amera.pdf, in 1 pages.
Sharper Image, Model JRT950NL, Slimline LED Lighted Tabletop 8X Magnification Mirror, https://www.amazon.com/Sharper-Imange-JRT950NL-Slimline-Magnification/dp/B015W76T3M?th=1, Jan. 20, 2016, in 8 pages.
Extended European Search Report in corresponding European Application No. 19862073.4, dated Oct. 14, 2022, in 11 pages.
Ilumay M-97 LED Smart Sensor Mirror, available from internet https://www.alibaba.com/product-detail/ilumay-M-97-led-smart-sensor_60701769220.html, availability as early as Dec. 16, 2017.

* cited by examiner

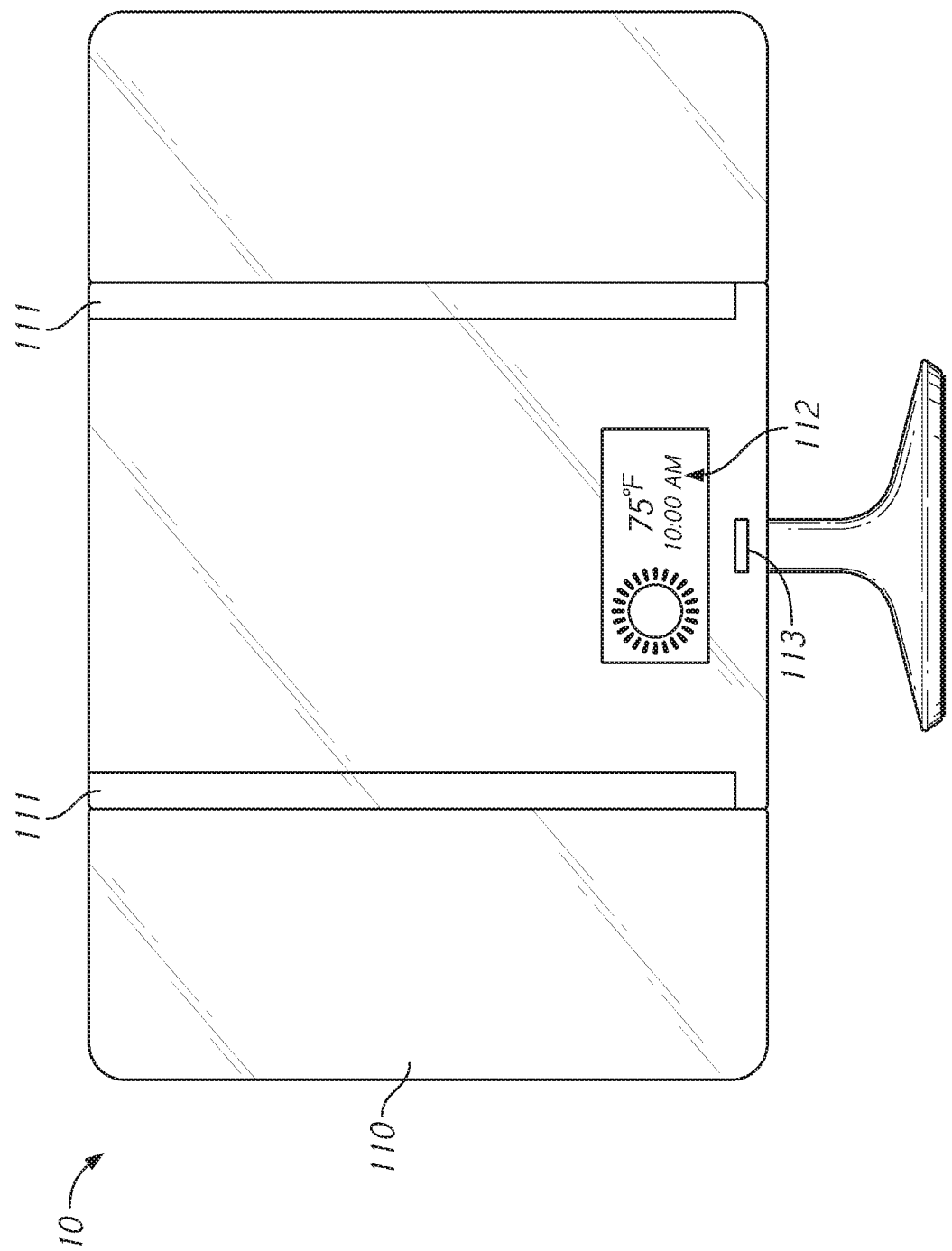

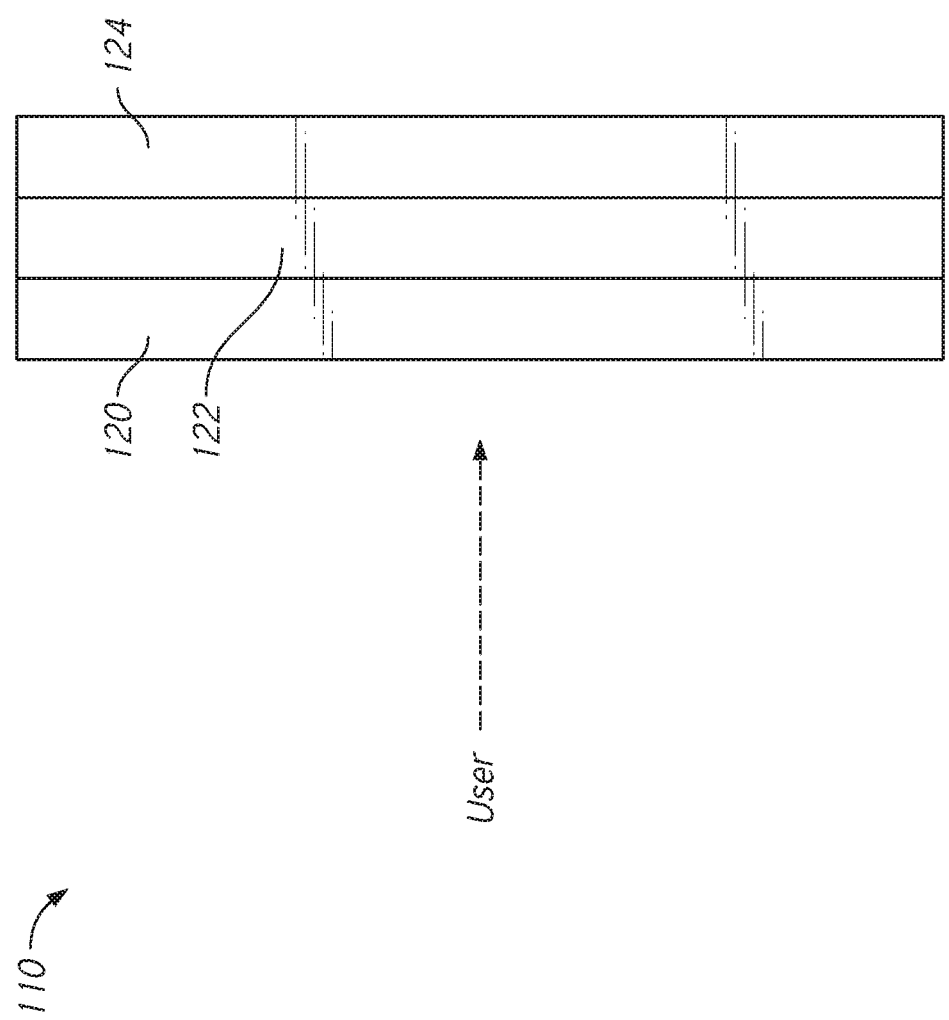

VANITY MIRROR

RELATED APPLICATIONS

This application claims the priority benefit under 35 U.S.C. § 119(e) of U.S. Provisional Patent Application No. 62/733,555, filed on Sep. 19, 2018, which is entitled "Vanity Mirror," and which is incorporated by reference herein for all that it discloses.

BACKGROUND

Field

The present disclosure relates to reflective devices, such as mirrors.

Description of the Related Art

Vanity mirrors are mirrors that are typically used for reflecting an image of a user during personal grooming, primping, cosmetic care, or the like. Vanity mirrors are available in different configurations, such as free-standing mirrors, hand-held mirrors, mirrors connected to vanity tables, bathroom wall mirrors, car mirrors, and/or mirrors attached to or produced by electronic screens or devices.

SUMMARY

Some embodiments disclosed herein pertain to a mirror assembly comprising a reflective portion configured to provide a reflected image of a user and a display portion positioned behind the reflective portion configured to communicate information to the user through the reflective portion.

Any of the mirror assembly features, structures, steps, or processes disclosed in this specification can be included in any embodiment.

In some embodiments, a mirror assembly comprises a mirror having a front surface and a rear surface, a glass layer, a dielectric layer, and a metal layer. For example, the glass layer can be disposed closest to a user of the mirror assembly. In some embodiments, the mirror assembly comprises a display device, a window configured to provide a view of the display device, and a display region disposed on the front surface of the mirror.

The dielectric layer can be disposed between the glass layer and the metal layer. The dielectric layer can include one or more alternating layers of Titanium dioxide and Silicon dioxide.

In some embodiments, the mirror assembly includes a dark coating disposed on at least a portion of the rear surface of the mirror.

The display device can be curved to engage the rear surface of the mirror. The display device can be flat.

In some embodiments, the mirror assembly includes a mounting mechanism. The mounting mechanism can be configured to couple the display device to the mirror.

The display region can be positioned outside of a central region of the mirror.

Certain aspects of this disclosure are directed toward a mirror assembly including a first mirror coupled to a second mirror. The first and second mirrors can each have a front surface, a rear surface, a reflectance, and a transmissivity. In some embodiments, the mirror assembly includes a display device, a window configured to provide a visual of the display device, and a display region disposed on the front surface of the first mirror.

The window can be disposed on one of the first mirror or the second mirror. The window can be transparent. The display region can be positioned outside of a central region of the first mirror. The transmissivity of the second mirror can be higher than the transmissivity of the first mirror. The reflectance of the second mirror can be higher than the reflectance of the first mirror.

The display device can be curved to engage the rear surface of the second mirror. The display device can be flat.

The first and second mirrors can have substantially the same diameter.

In some embodiments, the mirror assembly includes a mounting mechanism. The mounting mechanism can be configured to couple the display device to the second mirror.

The first mirror can include a glass layer, a dielectric layer, and a metal layer. The glass layer can be disposed closest to a user of the mirror assembly. The dielectric layer can be disposed between the glass layer and the metal layer. The dielectric layer can include one or more alternating layers of Titanium dioxide and Silicon dioxide.

BRIEF DESCRIPTION OF THE DRAWINGS

The features of the mirror assemblies disclosed herein are described below with reference to the drawings of certain embodiments. The illustrated embodiments are intended to demonstrate, but not to limit, the present disclosure. The drawings contain the following Figures:

FIG. 1 illustrates a front view of an embodiment of a mirror system.

FIG. 2 illustrates a schematic view of an embodiment of a base mirror.

DETAILED DESCRIPTION OF CERTAIN EMBODIMENTS

Figure 3A:
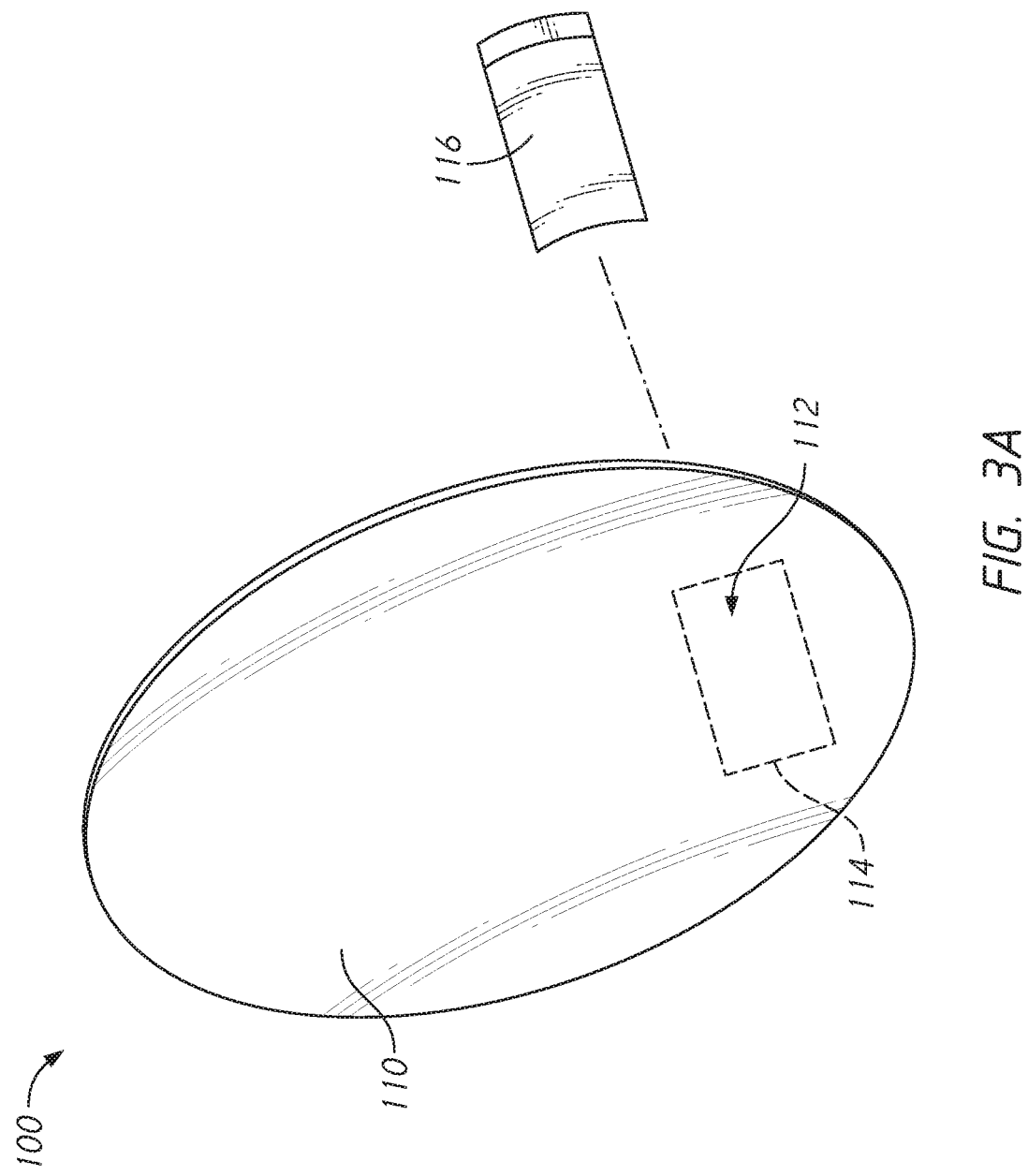
FIG. 3A illustrates an exploded view of an embodiment of a mirror assembly.

Certain embodiments of a mirror assembly are disclosed in the context of a portable, free-standing vanity mirror, as it has particular utility in this context. However, various aspects of the present disclosure can be used in many other contexts as well, such as wall-mounted mirrors, mirrors mounted on articles of furniture, automobile mirrors, such as rear-view mirrors or vanity mirrors (e.g., mirrors located in sun-visors), and otherwise. None of the features described herein are essential or indispensable. Any feature, structure, or step disclosed herein can be replaced with or combined with any other feature, structure, or step disclosed herein, or omitted.

As shown in FIG. 1, in some embodiments, a portable, free-standing mirror system 10 can include a mirror 110 and a display region 112. In this specification, the terms "portable" and "free-standing" are used in accordance with their ordinary meanings, and include devices that are not permanently attached to another structure or that are not attached to another structure in a manner that requires the use of tools to remove them, and/or devices that can be readily or easily transported and stored by a single person. In some embodiments, a portable device can include its own onboard power source. As illustrated in FIG. 1, in some embodiments a portable mirror system 10 can comprise an onboard illumination source, such as one or more illuminated strips 111, and a proximity sensor 113 configured to detect when a user is positioned at a location near the mirror. A processor within the mirror system 10 can be configured to illuminate the illumination source when the proximity sensor 113 detects the user. The processor, illumination source, and proximity detector can each be powered by an electrical power source, such as a standard outlet in a power grid or an onboard rechargeable battery or other power source. In some embodiments, as shown, the mirror system 10 can include a plurality of or separate mirror panes that can be permanently or temporarily oriented at the same or different angles with respect to the user.

The display region 112 can be configured to display information or media such as data, words, messages, images, photos, videos, and/or other graphics from an electronic display device. For example, in some embodiments, the user can view information relating to one or more of time, temperature, weather, traffic, financial information such as bank account entries or balances or financial market performance information or levels or predictions (e.g., stocks, bonds, interest rates, etc.), sporting event information (e.g., upcoming sporting schedules, outcomes of past sporting events such as scores or other statistics, team or player rankings, etc.), calendar or appointment scheduling information, individual communications (e.g., emails, texts, voicemail transcriptions), social media information (e.g., posts or information streams from social media websites or other sources such as Facebook, Instagram, Twitter, etc.), personal task lists or to-do lists, exercise or work-out instructions or coaching or task lists, dieting reminders or information or lists, news or current event information from news websites or other sources, televised information or programs (e.g., news or other televised shows, music videos, etc.), and/or any other suitable information while sitting or standing in front of the mirror 110. The mirror assembly 100 described herein can be incorporated into any suitable mirror system, such as mirror system 10. For example, a mirror assembly 100 or any component or grouping of components of a mirror assembly 100 can be used in any vanity mirrors, wall mirrors, medicine cabinet mirrors, mirrored building panels, advertising devices, and/or vehicular mirrors.

As shown in FIG. 2, in some embodiments a base mirror 110 is provided that includes glass and one or other layers. For example, in some embodiments, the base mirror 110 comprises a glass substrate and a backing layer, such as an opaque or substantially opaque, reflective metallic or metallic-appearing layer (e.g., comprising silver and/or aluminum) and/or a dark coating or paint such as a dark or black paint. In some embodiments, the base mirror 110 comprises one or more optical interference coatings or layers such as dielectric glass coatings or layers (e.g., glass with dielectric layers). In some embodiments, the base mirror 110 can include an optical interference structure comprising one or more extremely thin layers (e.g., with a thickness that is less than a single wavelength of visible light) that are configured to produce an optical effect such as a pre-determined reflectance and/or transmissivity of visible light at particular wavelengths or groupings of wavelengths. For example, in some embodiments, the optical interference structure can comprise a series of layers comprising at least one metallic layer and at least one dielectric layer, such as one or more alternating layers of Titanium dioxide (TiO2) and Silicon Dioxide (SiO2). In some embodiments, the base mirror 110 comprises glass, alternating layers of TiO2 and SiO2, and metal (e.g., aluminum). The base mirror 110 can include a layer of SiO2 on each side of a metal layer. A protective or opaque paint, coating, or layer can be included directly on the glass or on a metal layer and/or can be layered on top of a SiO2 layer or any other layer or structure of the base mirror 110. As used in this specification, the term "glass" is used in accordance with its ordinary meaning, which includes a silica-based hard, brittle, transparent material, typically formed in thin layers or panes. Each occurrence of "glass" in this disclosure should be considered to also contemplate and include the disclosure of non-glass substances or alternatives that are structured in a manner similar to glass or that perform in substantially the same way as glass, including one or more transparent coated or uncoated polymer sheet materials such as those comprising polycarbonate or acrylic. As with all disclosure in this application, any layer or substrate or combination of layers or substrates that are disclosed in connection with this embodiment can be replaced with or combined with any other layer or substrate or combination of layers or substrates that are disclosed elsewhere herein, or omitted.

In some embodiments, the base mirror 110 can have a first layer 120, a second layer 122, and a third layer 124. The material(s) of which each layer 120, 122, 124 are made can be glass, a dielectric material (e.g., TiO2, SiO2, etc.), metal (e.g., aluminum, silver, etc.), and/or any other suitable material. In some embodiments, the base mirror 110 can be assembled using a sputtering process, a vaporizing process, a deposition process, and/or any other suitable process. In some embodiments, one or more of the layers can be applied using adhesive, thermal bonding, sonic welding, or in any other suitable way. In some embodiments, the first layer 120, the layer disposed closest to the user, comprises glass. This can help prevent the mirror 110 from becoming scratched because glass is highly scratch resistant, much more scratch resistant than many other materials. In some embodiments, the second layer 122, the layer disposed between the first layer 120 and the third layer 124, comprises a metallic or dielectric material (e.g., TiO2, SiO2). In some embodiments, the third layer 124 or an additional layer comprises metal. One or more of the layers 120, 122, 124 can be used in the base mirror 110. One or more of the layers 120, 122, 124 can be omitted from the base mirror 110, rearranged or assembled in a different order, and/or supplemented by other layers or materials. For example, in some embodiments, a dark coating such as black paint and/or a copper layer is disposed on at least a portion of a metal layer of the mirror 110. Any layer or structure disclosed in this specification is not required to be homogeneous, but can include multiple sub-layers or sub-structures as appropriate.

The base mirror 110 can have various properties. The base mirror 110 can have a front surface and a rear surface. The front surface can be disposed closer to the user of the mirror assembly 100 than the rear surface. The base mirror 110 can be planar or curved. In a curved mirror, a user's image can be magnified. As shown in FIG. 1, the mirror 110 can include multiple panels. In some embodiments, the base mirror 110 can have a reflectance of at least about 90% and/or less than or equal to about 95%, and a transmissivity of at least about 5% and/or less than or equal to about 10%. In some embodiments, a dark coating such as black paint and/or a copper layer can be disposed on at least a portion of the rear surface of the base mirror 110. The base mirror 110 can be substantially round, square, rectangular, or any other suitable shape.

In some embodiments, an optical interference structure in the base mirror 110 can include a combination of layers such as the following:

Example 1

| Layer | Material | Optical Thickness | Physical Thickness (nm) |
|---|---|---|---|
| Substrate | protective paint | | |
| 9 | Al | 0.48 | 120 |
| 8 | SiO$_2$ | 1.0768 | 72.93 |
| 7 | TiO$_2$ | 1.2789 | 53.33 |
| 6 | SiO$_2$ | 1.2948 | 87.7 |
| 5 | TiO$_2$ | 1.3201 | 55.04 |
| 4 | SiO$_2$ | 2.3774 | 161.03 |
| 3 | TiO$_2$ | 1.3064 | 54.47 |
| 2 | SiO$_2$ | 2.1806 | 147.69 |
| 1 | TiO$_2$ | 2.0414 | 85.12 |
| Medium | glass | | |
| Total Thickness | | 13.3564 | 837.31 |

Example 2

| Layer | Material | Optical Thickness | Physical Thickness (nm) |
|---|---|---|---|
| Substrate | protective paint | | |
| 10 | SiO$_2$ | 0.7382 | 50 |
| 9 | Al | 0.48 | 120 |
| 8 | SiO$_2$ | 1.0768 | 72.93 |
| 7 | TiO$_2$ | 1.2789 | 53.33 |
| 6 | SiO$_2$ | 1.2948 | 87.7 |
| 5 | TiO$_2$ | 1.3201 | 55.04 |
| 4 | SiO$_2$ | 2.3774 | 161.03 |
| 3 | TiO$_2$ | 1.3064 | 54.47 |
| 2 | SiO$_2$ | 2.1806 | 147.69 |
| 1 | TiO$_2$ | 2.0414 | 85.12 |
| Medium | glass | | |
| Total Thickness | | 14.0946 | 887.31 |

Of course, many other types and orderings of layers can be used instead of or in addition to those provided in this example. In some embodiments, a reflectance of a mirror 110 with an optical interference structure on a glass substrate can be provided as shown in FIG. 6.

Figure 6:
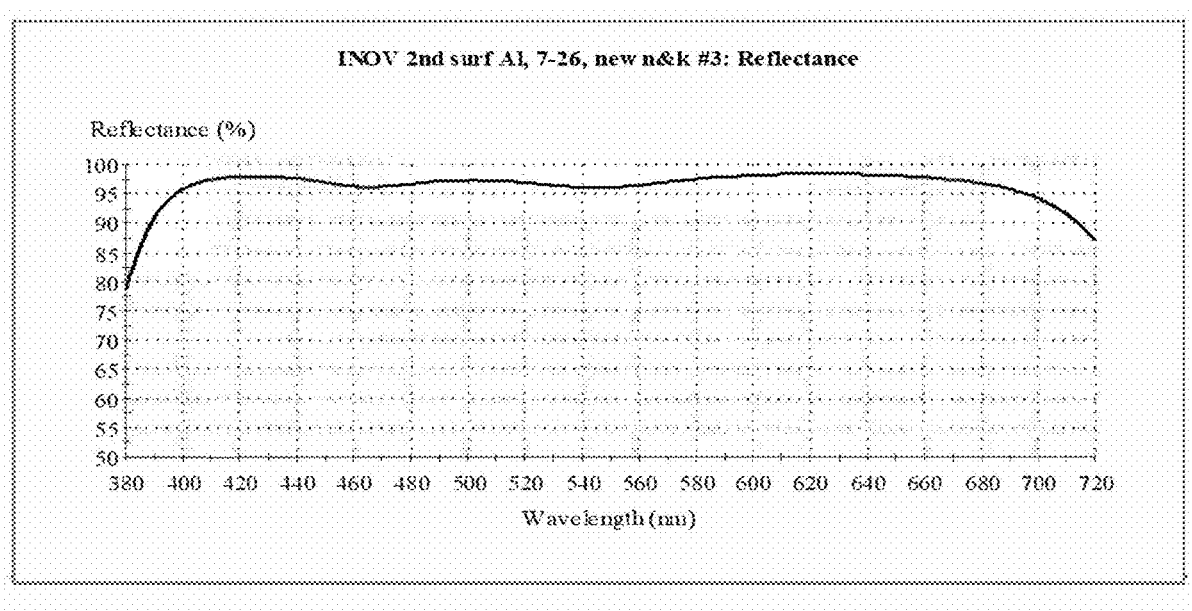
FIG. 6 is a graph showing the relationship between reflectance and wavelength.

For example, as shown in FIG. 6, for a large majority of the wavelengths of visible light, the reflectance can be at least about 95% or at least about 93% or at least about 90%. Of course, any other suitable component or series of components can be configured to provide many other or different values in a useful reflectance profile in accordance with the principles and structures disclosed in this specification.

As shown in FIGS. 3A-5B, in some embodiments, a mirror, such as the base mirror 110, can be included in the mirror assembly 100. As shown in FIGS. 3A, 4A, and 5A, in some embodiments, a display region 112 can be disposed on the front surface of the mirror 110 for viewing media of a display device 116. In some embodiments, as illustrated in FIG. 3B, a display device 116 can be coupled to the mirror 110. In some embodiments, a window 114 can be provided in the mirror 110 to enable the user to view the content shown on the display device 116. For example, the window 114 can allow the user to view information and/or graphics shown on the device 116 through the display region 112 of the mirror 110. In some embodiments, the window 114 is a portion of the mirror 110 that is more transmissive or less reflectant than one or more other portions of the mirror 110. In some embodiments, the window 114 can be formed by including a dark coating such as black paint and/or a copper layer on some portions of the rear surface of the mirror 110 and omitting that coating or layer on the portion of the rear surface of the mirror 110 that corresponds to the window 114. In some embodiments, the window 114 can be formed at least in part by a physical opening or hole or aperture or other absence of material in a component, such as a hole in a glass substrate through which or in which the display device 116 is inserted.

In some embodiments, the window 114 can be rectangular, square, circular, and/or any other suitable shape. In some embodiments, the window 114 can align with the display device 116 such that the window 114 and the display device 116 have one or multiple or all dimensions that are the same or substantially the same, enabling the window 114 and the display 116 to be positioned snugly or tightly or precisely together without any functionally or aesthetically significant gap or overlap. For example, the window 114 can be sized and shaped to align with the screen of the display device 116. The window 114 can be formed or positioned in any suitable portion of the mirror 110. For example, the window 114 can be formed along a periphery of the mirror 110, towards the bottom of the mirror 110, and/or along the sides of the mirror 110. In some embodiments, the mirror 110 includes more than one window 114. In some embodiments, the window 114 is positioned in a region of the mirror outside of the primary viewing zone of the mirror. For example, as shown in the mirror system 10 of FIG. 1, the display region 112 can be positioned below or otherwise outside of the central region of the mirror 110, where the user's gaze will normally be directed during a majority of usage time of the mirror system 10. In this way, the user can proceed with most normal usage activities while occasionally glancing over at the display region 112, without creating an obstruction in the user's image by the display region 112.

In some embodiments, the electronic display device 116 can have a liquid crystal display (LCD), thin-film-transistor (TFT) display, light-emitting diode (LED) display, and/or any other suitable type of display. In some embodiments, the screen or display of the display device 116 is selectively obscured or virtually hidden from the user's casual view and/or only visible to the user when the display device 116 is on. For example, the entirety or substantially the entirety of the front surface of the mirror 110, including the region of the window 114, may appear reflective to the user when the display device 116 is off. In some embodiments, the difference between the reflectance of the display region 112 and the reflectance of the majority of the area of the rest of the mirror 110 is less than or equal to about 10% or less than or equal to about 5% or less than or equal to about 2%. In some embodiments, the overall reflectance of the mirror 110 from the perspective of the user is at least about 90% or at least about 93%.

In some embodiments, the user can actuate a power button or any other button to turn the display device 116 on and off or to otherwise control or change any other feature or function of the display device (e.g., brightness, information content, etc.). A power or other button can comprise an actuator on any portion of the housing of the mirror system 10 or a touch screen region on the mirror 110, or any other suitable structure or location for turning on or off the power or otherwise controlling or changing any other feature or function of the display device. In some embodiments, the user can turn the display device 116 on and off or otherwise control any function or feature of the display device 116 using the user's phone or other mobile electronic device by communicating by wire or wirelessly with the mirror system 10. In some embodiments, a sensor is configured to sense when the user is a certain distance from the mirror assembly 100. The sensor can be configured to illuminate the mirror system 10 and/or to turn the display device 116 on when the user is in front of the mirror assembly 100 and to turn the illumination off or to turn the display device 116 off, or to keep the illumination off or to keep the display device 116 off, when the user is not in front of the mirror assembly 100. In some embodiments, the display device 116 is always on. In some embodiments, the brightness of the display can dim when the user is not using the mirror assembly 100.

Figure 3B:
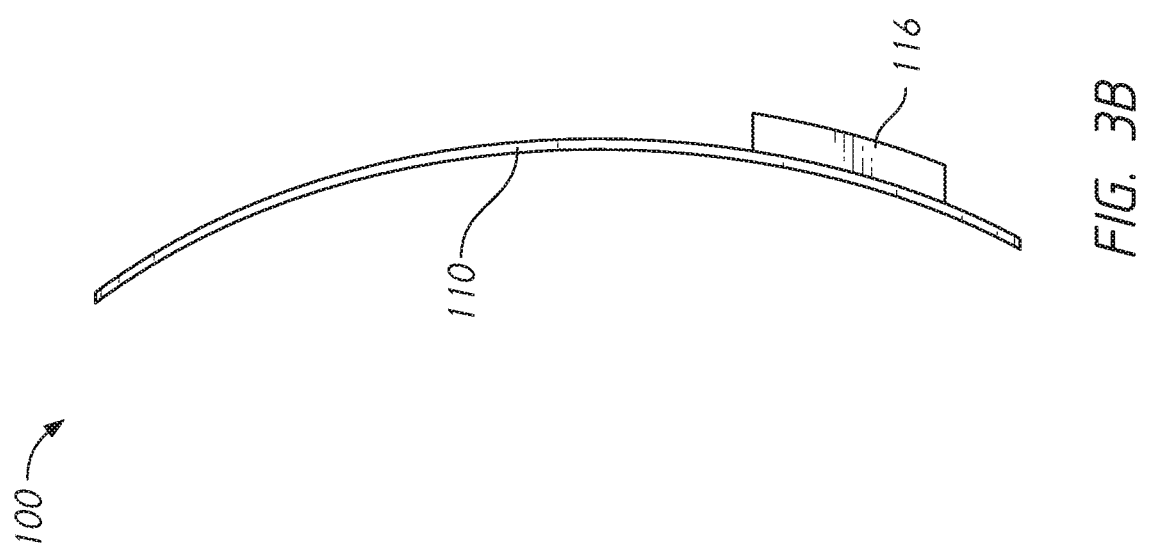
FIG. 3B illustrates a side view of the embodiment of FIG. 3A.

In some embodiments, the display device 116 can be curved and/or can be planar and adapted to mechanically couple to the mirror 110. In some embodiments, a front surface and/or a rear surface of the display device 116 can be curved. In some embodiments, the front surface and/or the rear surface of the display device 116 can be flat or planar. A curved display device 116 can help prevent refractance or ghosting of the display of the display device 116 and/or can avoid the perception by the user of one or more gaps or varying depth between the mirror 110 and the display device 116. For example, in some embodiments as shown in FIG. 3B, the display device 116 can be curved to engage a curved rear surface of the mirror 110. In some embodiments, the mirror assembly 100 can include a mounting mechanism or bracket configured to couple a generally planar portion of the display device 116 to a curved surface of the mirror 110. The display device 116 can be mounted to any suitable portion of the mirror assembly 100. For example, the display device 116 can be mounted to a periphery of the mirror 110, towards the bottom of the mirror 110, and/or along the sides of the mirror 110. In some embodiments, the mirror assembly 100 includes more than one display device 116.

In some embodiments, the display device 116 is configured to automatically change the information or content that it displays. For example, in some embodiments, the display device 116 can automatically transition between different types of content (e.g., time, temperature, weather, traffic, videos, data, etc.) after a set amount of time (e.g., at least about 5 seconds and/or less than or equal to about 20 seconds). In some embodiments, the information or content shown by the display device 116 can be controlled by the user. For example, in some embodiments, the display device 116 can have a capacitive sensor or other actuator that allows the user to interface with the display and/or touch the display to change or modify the content of the display device 116. In some embodiments, the mirror assembly 100 can be compatible with the user's phone and can allow the user to vary the content on the display device 116 by using an application on the user's phone. For example, in some embodiments, the user can configure the display device 116 to display text message alerts.

In some embodiments, the mirror assembly 100 and/or display device 116 can be configured to be continuously connected to a power source and/or rechargeable.

As shown in FIGS. 4A-5B, in some embodiments, a first mirror 110A and a second mirror 110B, such as the base mirror 110, can be included in the mirror assembly 100. In some embodiments, the first and second mirrors 110A, 110B can both be curved or non-planar as shown, such as with corresponding curvatures that permit the first and second mirrors 110A, 110B to fit closely together without any functionally significant gap between them. The first and second mirrors 110A, 110B can be placed adjacent to each other or in contact with each other when the mirror system 10 is assembled, such as with a mechanical clip or bracket, or with optical adhesive. Any features described above (e.g., regarding the base mirror 110) can apply to the first mirror 110A and second mirror 110B. For example, in some embodiments, the display device 116 can be curved to engage the rear surface of the first and/or second mirror 110A, 110B. The first mirror 110A can be disposed closer to the user than the second mirror 110B. In some embodiments, the first mirror 110A and the second mirror 110B are about or approximately the same shape and size or similarly shaped and sized. For example, in some embodiments, the first and second mirrors 110A, 110B have substantially the same diameter. In some embodiments, the first and second mirrors 110A, 110B are shaped and/or sized differently. For example, the second mirror 110B can be shaped and sized or structured in one or more ways to correspond to the display region 112.

Figure 4A:
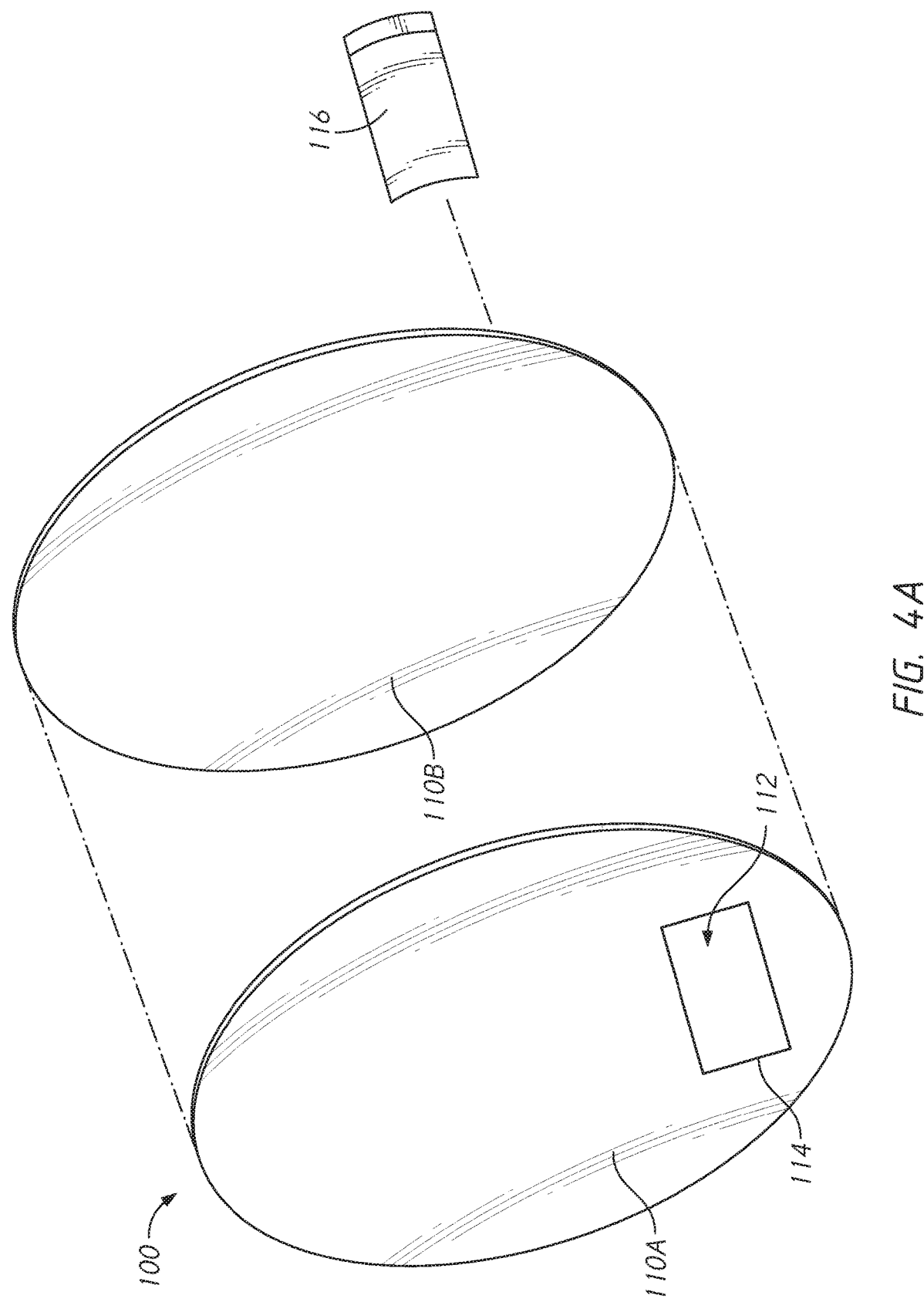
FIG. 4A illustrates an exploded view of another embodiment of a mirror assembly.
Figure 4B:
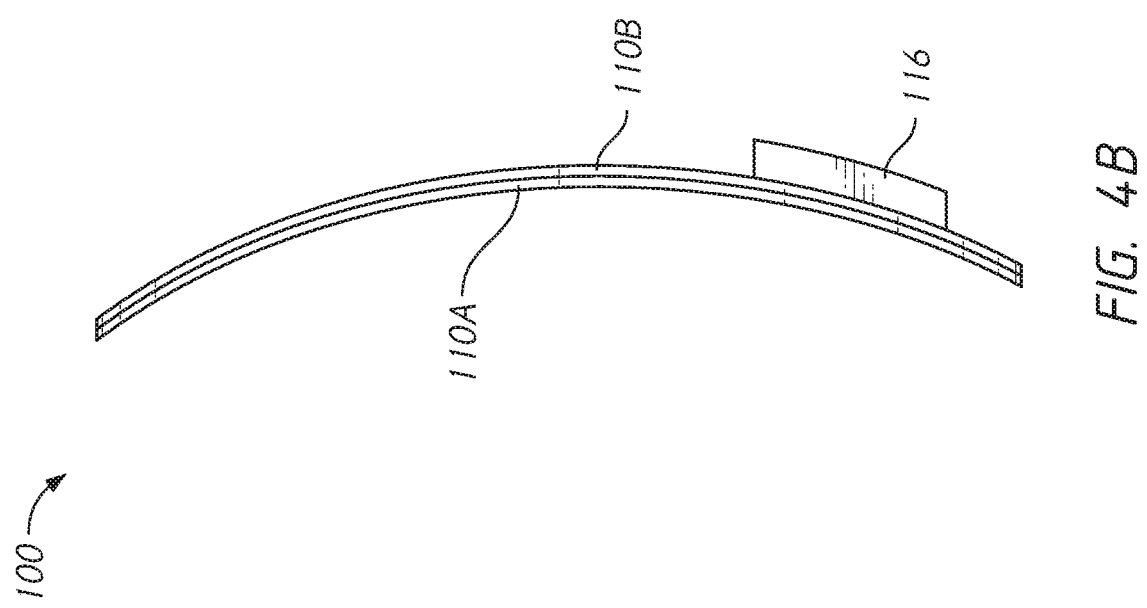
FIG. 4B illustrates a side view of the embodiment of FIG. 4A.

As shown in FIG. 4A, the reflectance and transmissivity of the first mirror 110A and the second mirror 110B can be different. For example, in some embodiments, the transmissivity of the second mirror 110B (e.g., at least about 6%, or at least about 8%, or at least about 10%, or at least about 12% transmissivity) can be higher than the transmissivity of the first mirror 110A (e.g., less than or equal to about 3%, or less than or equal to about 5%, or less than or equal to about 7%, or less than or equal to about 9% transmissivity). In some embodiments, the first mirror 110A can have a higher reflectance (e.g., at least about 95% or at least about 93% or at least about 91% reflectance) than the second mirror 110B (e.g., less than or equal to about 94% or less than or equal to about 92% or less than or equal to about 90% reflectance), with a window 114 in the first mirror 110A that is highly transmissive (e.g., essentially transparent). The first mirror 110A can have a thin metal coating or layer (e.g., silver, aluminum, etc.), or any other suitable coating or backing on the portion of the rear surface of the first mirror 110A that surrounds the window 114. As illustrated in FIG. 4B, the first mirror 110A can be coupled to a second mirror 110B that has a higher transmissivity than the first mirror 110A. For example, in some embodiments the second mirror 110B can have a reflectance of about 90% and a transmissivity of about 10%. The existence of the essentially transparent window 114 in the first mirror 110A, and/or the higher transmissivity of the second mirror 110B, can allow the user to view the content of the display device 116 in or through the display region 112 of the first mirror 110A, as illustrated in FIG. 4A.

Figure 5A:
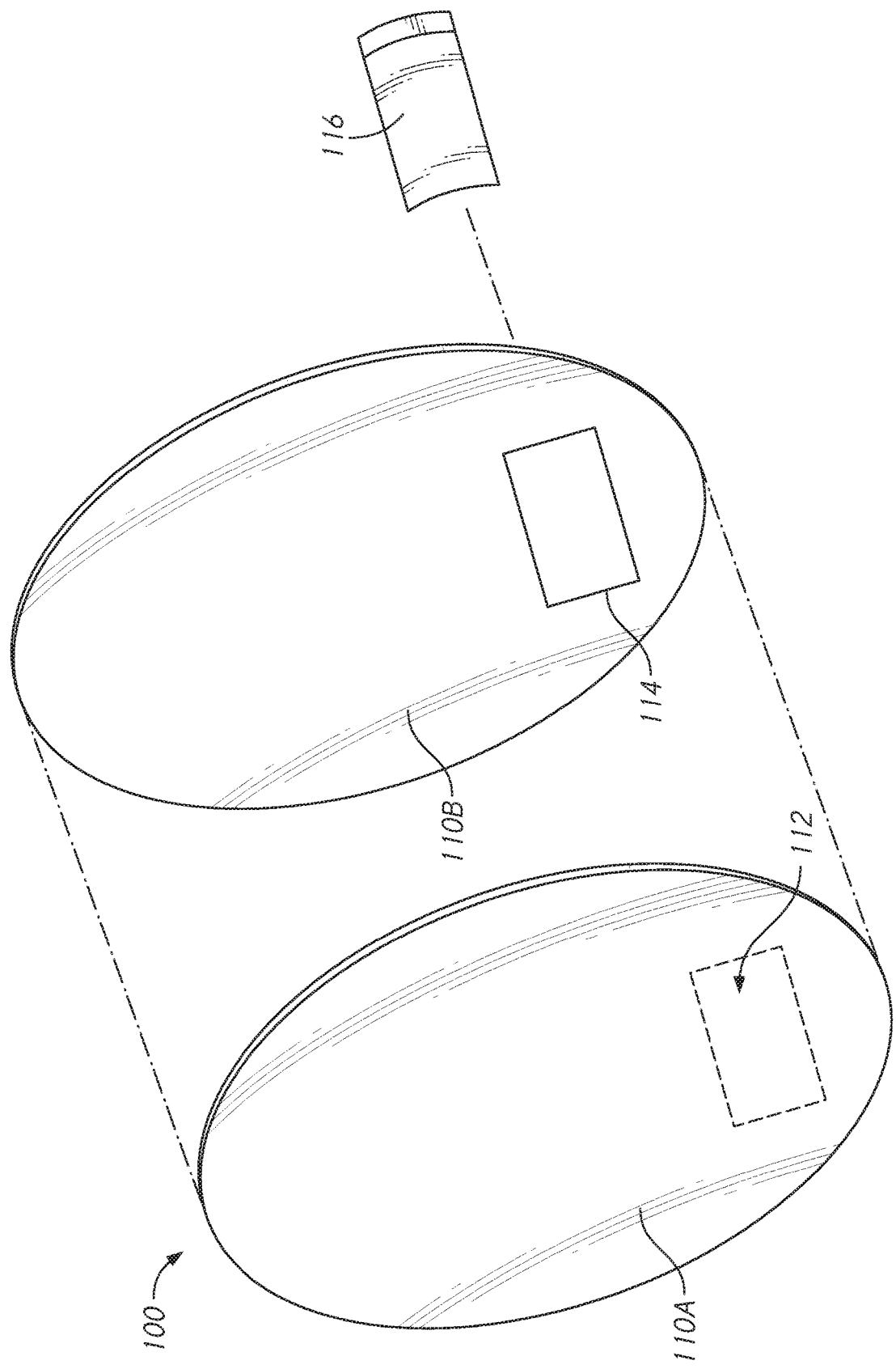
FIG. 5A illustrates an exploded view of another embodiment of a mirror assembly.
Figure 5B:
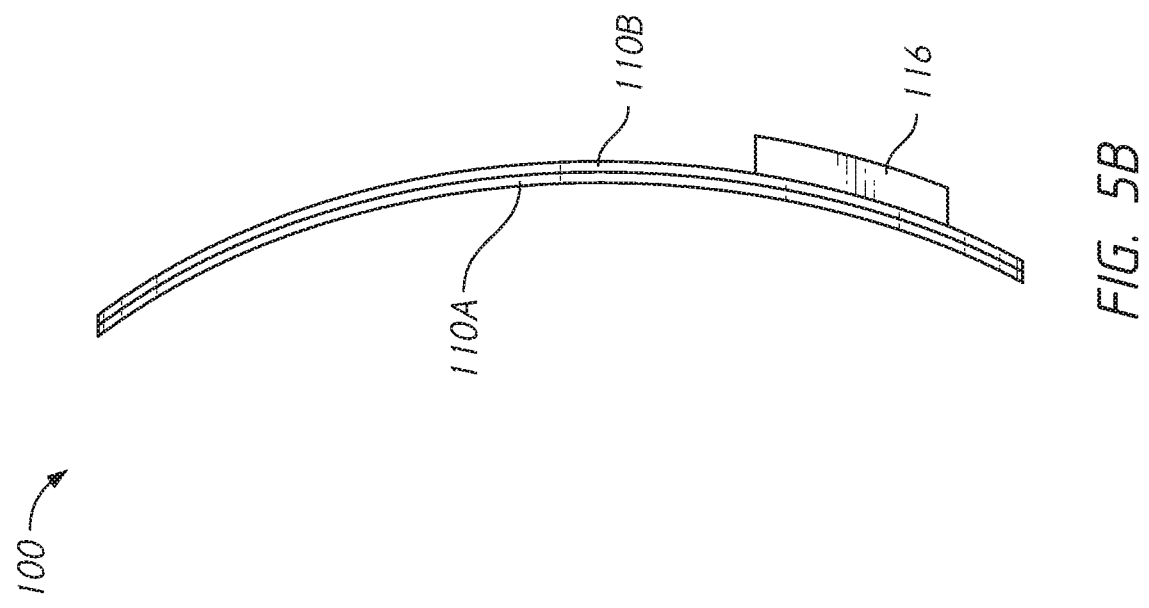
FIG. 5B illustrates a side view of the embodiment of FIG. 5A.

As shown in FIG. 5A, in some embodiments, the reflectance of the second mirror 110B can be higher than the reflectance of the first mirror 110A. For example, in some embodiments, the first mirror 110A can have a reflectance of less than or equal to about 92% or less than or equal to about 90% and a transmissivity of at least about 8% or at least about 10%. The second mirror 110B can have a higher reflectance of at least about 93% or at least about 95% and a window 114 that is highly transmissive (e.g., essentially transparent) in the second mirror 110B. The window 114 can comprise an aperture or hole for receiving the display device 116. The higher reflectance of the second mirror 110B can cause the overall reflectance of the mirror assembly 100 to be higher than the reflectance of the first mirror 110A by itself (e.g., the reflectance of the overall mirror assembly 100 can be at least about 92% or at least about 94%). The first mirror 110A having the higher transmissivity, and the transparent window 114 in the second mirror 110B, can allow the user to view the content of the display device 116 in the display region 112 of the first mirror 110A, as illustrated in FIG. 5A.

As shown in FIGS. 4A and 5A, in some embodiments, the window 114 can be provided in the first mirror 110A and/or the second mirror 110B. In some embodiments, the window 114 can be a transparent region of the first mirror 110A and/or the second mirror 110B. The window 114 can be formed or positioned in any suitable portion of the mirror assembly 100. For example, the window 114 can be formed along a periphery of the first and/or second mirror 110A, 110B, towards the bottom of the first and/or second mirror 110A, 110B, and/or along the sides of the first and/or second mirror 110A, 110B. In some embodiments, the mirror assembly 100 includes more than one window 114.

Although the mirror assembly has been disclosed in the context of certain embodiments and examples, it will be understood by those skilled in the art that the present disclosure extends beyond the specifically disclosed embodiments to other alternative embodiments and/or uses of the subject matter and obvious modifications and equivalents thereof. In addition, while several variations of the mirror assembly have been described in detail, other modifications, which are within the scope of the present disclosure, will be readily apparent to those of skill in the art based upon this disclosure. It is also contemplated that various combinations or sub-combinations of the specific features and aspects of the embodiments can be made and still fall within the scope of the present disclosure. It should be understood that various features and aspects of the disclosed embodiments can be combined with or substituted for one another in order to form varying modes of the mirror assembly. Thus, it is intended that the scope of the subject matter herein disclosed should not be limited by the particular disclosed embodiments described above.

The following is claimed:

1. A free-standing mirror assembly comprising:
   a first mirror having a circular shape and a second mirror having a circular shape, each mirror having a front surface, a rear surface, a reflectance, and a transmissivity, the front surface of the second mirror coupled to the rear surface of the first mirror, the second mirror having a reflective layer, wherein the front surface of the first mirror faces a user during use, and wherein the rear surface of the first mirror has a curvature and the front surface of the second mirror has a curvature, the curvature of the rear surface of the first mirror generally corresponding to the curvature of the front surface of the second mirror;
   a display device positioned behind the rear surface of the second mirror;
   a transparent window in the first mirror, the transparent window configured to provide a visual of the display device;
   a display region disposed on the front surface of the first mirror, wherein the display device is selectively obscured or virtually hidden from a user's view when turned off; and
   a proximity sensor configured to detect a user positioned at a location near the free-standing mirror assembly and configured to illuminate an illumination source when the user is detected.

2. The free-standing mirror assembly of claim 1, wherein the display region is positioned outside of a central region of the first mirror.

3. The free-standing mirror assembly of claim 1, wherein the reflectance of the second mirror is higher than the reflectance of the first mirror.

4. The free-standing mirror assembly of claim 1, wherein the display device is curved to engage the rear surface of the second mirror.

5. The free-standing mirror assembly of claim 4, wherein the curved display device has a curvature corresponding to a curvature of the rear surface of the second mirror.

6. The free-standing mirror assembly of claim 1, further comprising a coupler configured to couple the display device to the second mirror.

7. The free-standing mirror assembly of claim 1, wherein the first mirror comprises a glass layer, a dielectric layer, and a metal layer, the glass layer being disposed closest to a user of the free-standing mirror assembly.

8. The free-standing mirror assembly of claim 7, wherein the dielectric layer is disposed between the glass layer and the metal layer and comprises one or more alternating layers of Titanium dioxide and Silicon dioxide.

9. The free-standing mirror assembly of claim 1, wherein the transparent window is formed along a periphery of the first mirror towards a bottom portion of the periphery of the first mirror.

10. The free-standing mirror assembly of claim 1, wherein the first mirror and the second mirror have different diameters.

11. The free-standing mirror assembly of claim 1, wherein the transparent window is formed in at least one of along a periphery of the first mirror, towards a bottom of the first mirror, and along a side of the first mirror.

* * * * *